United States Patent [19]

Fox

[11] 4,307,135

[45] Dec. 22, 1981

[54] PROCESS FOR PREPARING AN ASYMMETRIC PERMSELECTIVE MEMBRANE

[75] Inventor: Ronald L. Fox, San Diego, Calif.

[73] Assignee: The United States of America as represented by the Secretary of the Interior, Washington, D.C.

[21] Appl. No.: 138,397

[22] Filed: Apr. 8, 1980

[51] Int. Cl.$^3$ .......................... B05D 3/10; B05D 5/00
[52] U.S. Cl. ..................................... 427/244; 264/41; 264/45.5; 264/49; 427/246; 521/64
[58] Field of Search .............................. 427/244, 246; 210/500.2; 264/41, 45.5, 49; 521/63, 64

[56] References Cited

U.S. PATENT DOCUMENTS 3,615,024 10/1971 Michaels ...................... 210/500.2 X
3,852,388 12/1974 Kimura ........................ 210/500.2 X Primary Examiner—Evan K. Lawrence
Attorney, Agent, or Firm—William S. Brown; Donald A. Gardiner

[57] ABSTRACT

Asymmetric reverse osmosis membranes are made from synthetic aromatic polyimides having a relatively high predominance of polar groups in the polymer backbone. A polar/non-polar group ratio of from 2:2 to 2:7 per imidized nitrogen link is required. Such membranes can be fabricated using conventional casting equipment by providing a solution of the polyimide in a good solvent and a poor solvent, the poor solvent being compatible with solution components at poor solvent/good solvent ratios of at least 1:1 up to about 7:1, casting a film of such solution, and partially evaporating the exposed surface of the cast film for $100 \pm 30$ seconds prior to gelation.

4 Claims, No Drawings

PROCESS FOR PREPARING AN ASYMMETRIC PERMSELECTIVE MEMBRANE

BACKGROUND OF THE INVENTION

1. Technical Field

The present invention relates to a single stage process for making polyimide reverse osmosis membranes and, more particularly, asymmetric semipermeable membranes fabricated from aromatic polyimide polymers and copolymers.

2. Background Art

Asymmetric semipermeable membranes and their use in reverse osmosis processes have been known for some time. An asymmetric membrane may be defined as an entity composed of an ultra thin dense skin over a thick swollen porous substructure of the same material. Reverse osmosis processes have typically been employed in the production of potable water from saline and brackish water supplies and from waste streams and involve the diffusion of pure water through a membrane from the water feed solution and the concentration and retention of salt molecules and other impurities by the membrane.

The techniques for making asymmetric membranes from cellulose acetate polymers are well known and are disclosed in U.S. Pat. Nos. 3,133,132 and 3,133,137 issued on May 14, 1964 to Loeb et al., 3,497,072 issued Feb. 24, 1970 to Cannon, and 4,026,978 issued May 31, 1977 to Mungle et al. Cellulose acetate membranes find wide application in the purification of neutral feed waters. However, they are subject to degradation at pH extremes and to both chemical and bacterial attack. Polyamides are also employed in the manufacture of asymmetric membranes, such as is disclosed in U.S. Pat. No. 3,567,632 issued to Richter et al. on Mar. 2, 1971. However, these membranes suffer the disadvantage of extreme sensitivity to degradation by trace quantities of chlorine and other oxidizing agents normally present in process feed streams. Recently, as described in U.S. Pat. No. 3,861,303, issued on June 11, 1974 to Wrasidlo, asymmetric poly(N-amido)imide membranes have been prepared. These polymers, however, have been found to be chemically reactive and soluble in a wide variety of solvents, probably due to the presence of active hydrogens on the amido nitrogens. Moreover, these polymers cannot withstand elevated temperatures.

The inherently greater chemical, biological, and thermal stability of polyimides over the membrane materials used in the prior art makes them attractive candidates for use in reverse osmosis membranes. This was recognized by J. K. Beasley of E. I. duPont de Nemours & Company in a paper presented at the December 1977 meeting of IDEA in Tokyo. He mentioned polyimides as one of over three hundred candidate polymer compositions tested but found unsuitable for reverse osmosis membranes.

Summary of the Invention

It is an object of this invention to provide a commercial scale production process for making polyimide reverse osmosis membranes having high water flux and solute rejection properties.

It is another object of this invention to provide a method of fabricating polyimide reverse osmosis membranes which employs only casting machines and other equipment already available and currently in use in the industry.

Other objects and advantages will become apparent from the following description and the appended claims.

Briefly stated, in accordance with the aforesaid objects, a process has been developed for preparing asymmetric reverse osmosis membranes demonstrating superior environmental and thermal stability and meeting quality and economic standards for brackish water demineralization from synthetic aromatic polyimide polymers and copolymers which have a relatively high predominance of polar groups in the polymer backbone. The polyimides useful in the practice of this invention are those having a recurring polymeric unit represented by the formula:

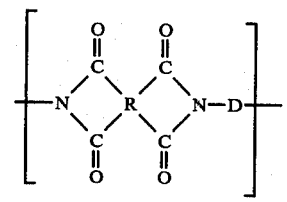

wherein R is a tetravalent organic radical and D is a divalent organic radical, both of which radicals are characterized by being low molecular weight, aliphatic and/or aromatic groups with or without interposed divalent polar groups. The ratio of polar groups to non-polar groups per imidized nitrogen link in the recurring polymeric unit should range from 2:2 to 2:7 lest the hydrophilic properties of the resultant membranes will be inadequate for use in aqueous demineralization systems.

Further, in accordance with this invention, it has been discovered that the fabrication of polyimide membranes is adaptable to current membrane production techniques. The process of this invention is carried out in a single stage and involves the use of casting solution components in specified proportions and controlled casting and gelation conditions. Specifically, the casting solution comprises a good solvent for the polyimide and a poor solvent for the polyimide, the poor solvent being compatible with solution components at poor solvent/good solvent ratios of at least 1:1 up to about 7:1. An important feature of the process is the partial evaporation of a cast film of the polyimide for $100\pm30$ seconds prior to gelation.

BEST MODE FOR CARRYING OUT THE INVENTION

The polyimides useful in the practice of this invention are those represented by the above formula wherein R is a tetravalent organic radical, such as a pyromellitic acid dianhydride residue or a benzophenone-3,3',4,4'-tetracarboxylic acid dianhydride residue, and D is a divalent, low molecular weight, aliphatic and/or aromatic organic radical selected from the group consisting of 2,4-tolylene, 2,6-tolylene, methylene di-p-phenylene, methylene, polymethylene having up to about 6 carbon atoms, and mixtures of the same.

Polyimides can be specially produced for use in this invention via techniques well known in the art or they can be obtained in suitable form from various manufacturers. Fully cured polyimides have been found to be useful in the practice of the instant invention if they contain low molecular weight aliphatic and/or aromatic groups combined with a substantial number of polar groups per each repeating submolecular unit containing the imidized nitrogen. The polar groups are typically carbonyl groups which are derived from the tetracarboxylic acid dianhydride starting material and which are formed during the condensation reaction of the imide precursors, but other polar groups, such as sulfonyl, nitro and nitrosyl, may be interposed within the units making up the polymer. The polar groups function to give the ultimate polyimide membrane suitable hydrophilicity or water sorptivity which is necessary for aqueous reverse osmosis applications.

The requirement for polar groups in the polymer (or copolymer) backbone can be expressed as a ratio of polar groups to non-polar groups contained in a candidate imide condensation link. The non-polar groups are the low molecular weight aliphatic and/or aromatic hydrocarbon units included in the polymer chain. For the purpose of illustration, a polyimide prepared by the condensation of pyromellitic acid dianhydride and toluene-2,4-diamine has an imide condensation link represented by the formula:

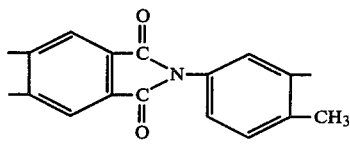

The polar to non-polar group ratio for this imide linkage is 2:2, the two polar carbonyls deriving from one of the anhydride groups and one non-polar aromatic group deriving from the diamine and the second being the pyromellitic acid residue.

In polyimides where the tolylene group is substituted with a polymethylene having two or more —CH₂— groups, the ratio increases by one for each methylene beyond the first so that a condensation product of pyromellitic acid dianhydride with, for instance, hexamethylenediamine will result in a polar to non-polar group ratio of 2:7. Such a material has been found to possess acceptable hydrophilic properties and is suitable for employment as a reverse osmosis membrane. By contrast, long chain aliphatic based polyimides having ratios beyond 2:7 are less satisfactory for reverse osmosis applications due to the low water sorptivity of such materials. Accordingly, it has been found that the ratio of polar groups to non-polar groups in the imide linkage must range between 2:2 to 2:7 in order for the polyimide to qualify for use in the present invention.

Polyimides with a high predominance of aromatic structure are preferred for the practice of this invention. One such polyimide is a fully imidized material manufactured by The Upjohn Company which is designated No. 2080. It is a highly polar copolymer derived from the co-condensation of benzophenone-3,-3',4,4'-tetracarboxylic acid dianhydride (BTDA) and a mixture of di(4-aminophenyl) methane and toluene diamine (or the corresponding diisocyanates, 4,4'-methylenebis(phenyl isocyanate) and toluene diisocyanate, MDI and TDI, respectively) as described in U.S. Pat. No. 3,708,458 which issued on Jan. 2, 1973 to Albertino et al. The obtained copolyimide has imide linkages which may be represented by the formulas:

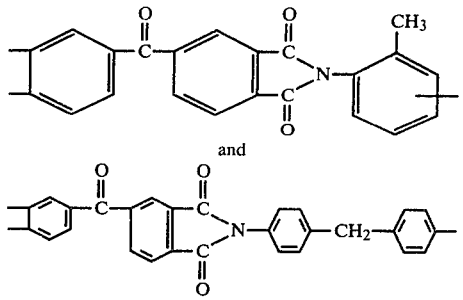

The ratio of polar to non-polar groups in the respective formulas is 3:3 and 3:5.

Asymmetric semipermeable membranes in accordance with the present invention may be produced continuously from polyimides by means of conventional machine casting equipment. Historically, processes for the preparation of asymmetric reverse osmosis membranes in quantities suitable for economical production and exhibiting desirable permselectivity were developed for cellulose acetate polymer systems. Typically, a casting dope is formed by dissolving one or more polymers in a suitable organic solvent which also contains solution modifiers, such as pore forming agents, swelling agents, etc. The solution is cast by spreading a film of the casting dope on a suitable surface, followed by the partial evaporation of the solvent and ultimate gelation of the film in cold water.

In accordance with this invention, the basic casting solution formulation required to form an asymmetric polyimide membrane is one which includes a good solvent for the polymer to which a solution modifier is added. The solution modifier functions to reduce the solubility limit of the polymer in the solvent and thus cause rapid skin formation upon evaporation or gelation. Thus, the modifier is generally a non-solvent or a poor solvent for the polymer. It must, however, be compatible to a limited extent with the polymer solution and must be completely compatible with the gelation medium.

In general, polyimides are resistant to the solvent action of most organic materials. Among the limited number of solvents which are known to dissolve polyimides are dimethylsulfoxide (DMSO), N,N'-dimethylformamide (DMF), N,N'-dimethylacetamide (DMAC), hexamethylphosphoric triamide (HMPA), N-methylpyrrolidone (NMP), pyridine, and tetramethylurea (TMU). The polyimides are insoluble in practically all simple organic solvents such as alcohols, esters, ethers, ketones and chlorinated hydrocarbons. For example, ethyl alcohol, dioxane, acetone and chloroform, to mention a few, have no solubilizing effect on polyimides.

For the polyimides useful in the practice of this invention, the preferred solvent system for the machine casting of membranes comprises N,N'-dimethylformamide (DMF) as the solvent and dioxane as the solvent modifier. The limit of compatibility of dioxane with solutions of polyimides in DMF has been found to be at dioxane/DMF ratios of less than 7. At ratios of 7:1 or greater, the polyimides precipitate spontaneously from solution and solution conditions necessary for casting cannot be maintained. For the practice of this invention, dioxane/DMF ratios in the range of approximately 0.5 to less than 7.0 are workable, although the preferred range is from 3 to 6. A preferred casting solution includes from 18 to about 25 weight percent polyimide, from 60 to about 70 weight percent dioxane and from 20 to about 10 weight percent DMF.

Other solution modifiers may be substituted for the dioxane component of the preferred casting dope. Exemplary of such modifiers are 4-butyrolactone, sulfolane, and morpholine. These modifiers have a higher level of compatibility with solutions of polyimide in DMF than dioxane so that they may be employed both within the same range of ratios as indicated above and in ratios higher than 7:1.

Tetrahydrofuran (THF) and bis(2 methoxyethyl) ether may also be employed as solution modifiers in the practice of this invention but the limit of compatibility of these materials with DMF solutions of polyimides is substantially lower than that of the preferred modifiers noted above. For instance, additions of up to 40 weight percent of THF have been employed in DMF solutions containing 20 weight percent polymer, although best results are attained with additions of up to about 27 weight percent. Thus, for the practice of this invention THF or bis(2-methoxyethyl)ether/DMF ratios of less than 0.5 to about 1 are suitable for producing asymmetric polyimide membranes.

Auxiliary components, such as pore formers and swelling agents, may also be employed in the casting solutions of this invention. Pore formers selected from the group consisting of water soluble alcohols such as t-butanol, isopropanol and Methyl Cellosolve, ketones such as acetone and diacetone alcohol, and mineral acids or their salts may be included up to 2 weight percent of the solution, with from 0 to 1 weight percent preferred.

Other polyimide solvents, such as, for example, DMAC, NMP, DMSO, and pyridine, may be substituted in the solvent system for the preferred solvent, DMF.

Polyimide membranes are fabricated in a single stage process by machine casting at ambient temperatures directly onto a suitable support fabric or, alternatively, if an unsupported membrane is desired, upon a glass plate or release belt. Prior to gelation, the film thickness of the casting should not exceed about 0.2 mm exclusive of the supporting fabric. The optimum film thickness is 0.17 mm. The casting speed must be regulated so that sufficient time is allowed for solvent evaporation from the exposed film surface. If the film is gelled before a partial loss of solvent is permitted to occur at the surface, a sufficiently dense permselective layer will not be created in the film. Conversely, if too much evaporation time is allowed or the cast film dries before controlled gelation, the resultant membrane is unsuited to the purpose for which it is intended. That is, the dense permselective portion of the membrane is so thick that water flux through the membrane is seriously affected or negated. The preferred evaporation time for machine cast polyimide membranes is 100±30 seconds so that the casting speed should be regulated within the range of 0.5 to 1.5 feet per minute.

When a solution of the preferred formulation is cast as a film and a partial loss of solvent is permitted to occur at the surface of the film, rapid precipitation of the polymer takes place at the film surface upon immersion of the film into a gelation medium, thereby forming a thin dense skin. The subsequent diffusion of the gelation medium into the film results in the formation of a relatively thick, porous layer that serves as a support for the active surface initially formed. For the practice of this invention, water or an aqueous bath is the preferred gelation medium.

Skin thickness and skin integrity are controlled by conditions of gelation and bath temperature. While the cast and partially evaporated polyimide films may be gelled in water baths maintained within the range of 15° to 32° C., best results have been experienced when the gelation medium is maintained at about 25° C. Also, the bath should be as still as possible to promote skin thickness uniformity in the resultant membrane. A lack of uniformity arises when the water level "dances" or ripples back and forth in the bath as the film is immersed and the problem is particularly apparent when the cast film enters the bath at angles close to vertical. Accordingly, the total included angle of the cast film to the water line should range between 100° and 135°. The optimum angle has been found to be 110°.

Through manipulation of casting and gelation conditions, membrane transport properties for the polyimide membranes of this invention can be tailored to meet desired specifications. For example, membranes capable of very high, about 99%, solute rejection or very high water flux, about 17 gallons per square foot per day (GFD), are readily obtained. Thus, membranes of this invention have been measured under common test conditions of 400 psig applied pressure on a 5000 ppm sodium chloride feed at ambient temperatures and have been found to exhibit the following membrane transport properties:

| % Rejection ($Cl^-$) | Water Flux (gal/ft$^2$ - day) |
|---|---|
| 92 | 17 |
| 99 | 6 |

For example, to obtain a membrane capable of 99% chloride ion rejection at 6 GFD, the film should be cast at ½ foot per minute and allowed to evaporate for about 130 seconds before gelation. Conversely, by casting at 1.5 feet per minute and allowing the cast film to evaporate for 70 or 80 seconds before gelation, the resultant membrane will have a water flux of 17 GFD and a chloride ion rejection of 92%. Obviously, membranes having not quite as good ion rejection as 99% but better water flux properties than 6 GFD can be made by adjusting casting and gelation conditions. The transport properties of commercially available membranes vary widely but, in general, are considered competitive if they have a water flux of 10 GFD or better and 95% solute rejection.

The above transport properties may be further enhanced by post gelation annealing, such as by immersion in hot water for from 5 to 15 minutes.

The following Example illustrates the best mode presently contemplated for carrying out the invention. It should be understood, however, that the illustration is merely exemplary and does not constitute a limitation upon the scope of the invention set forth in the appended claims.

EXAMPLE

A 20 weight percent solution of polyimide No. 2080 (manufactured by The Upjohn Company) is prepared. The polymer is admixed with a multi-component solvent system containing 67 weight percent of dioxane and 13 weight percent N,N'-dimethylformamide. These components are sealed and blended overnight on a rolling mill to effect complete solution.

When the solution has stabilized, a 0.17 mm polyimide film is continuously machine cast at room temperature onto a moving, one foot wide support fabric. The speed of the fabric is maintained at about one foot per minute to allow the film to evaporate for about 100 seconds. Following partial evaporation, the film is gelled by immersion in water maintained at 25° C. The total included angle of the cast film to the water line of the bath is kept at 110° during the immersion operation.

The resultant membrane is tested in the unannealed state at 400 psig applied pressure on a synthetic brackish water feed containing a sodium chloride concentration of 5000 mg/l. The transport properties of the membrane exhibit chloride ion rejection of 97% at a water flux of 12 GFD.

Industrial Applicability

The asymmetric polyimide membranes of this invention demonstrate properties of solute rejection and water flux suitable for use in commercially available reverse osmosis systems for the effective separation, at reasonable pressures, of salts, dissolved solids and other impurities. The membranes are also suitable for the treatment of fluids where the concentrate is the desired product, such as in the preparation of fruit juice concentrates and in the recovery of plating wastes including gold and chromium. Other potential applications are in the purification of organic solvents and in the separation of gaseous media.

Although the invention has been described with regard to certain preferred embodiments, it should be understood that such modifications as would be obvious to one having skill in the art may be made without deviating from the scope of the invention which is defined solely by the appended claims.

I claim:

1. A process for preparing an asymmetric permselective membrane consisting essentially of a synthetic aromatic polyimide derived from the co-condensation of benzophenone3,3',4,4'-tetracarboxylic acid dianhydride and a mixture of either (1) di(4-aminophenyl)methane and toluene diamine or (2) 4,4'-methylenebis (phenyl isocyanate) and toluene diisocyanate, said process comprising:
   (a) providing a solution of about 18 to 25 weight percent of said polyimide in about 20 to 10 weight percent of N,N'-dimethylformamide and about 60 to 70 weight percent of dioxane, said formamide being a good solvent for said polyimide;
   (b) casting a film of said polyimide solution onto a suitable surface;
   (c) partially evaporating the solvent system from the exposed film surface for 100±30 seconds; and
   (d) gelling the polyimide film by immersion in water maintained at 15° to 32° C., whereby a thin, dense permselective polyimide skin is formed over a relatively thick, porous polyimide layer.

2. A process in accordance with claim 1 wherein said polyimide solution contains up to 2 weight percent of a pore former selected from the group consisting of water soluble alcohols, ketones and mineral acids or salts thereof.

3. A process in accordance with claim 1 wherein said polyimide film is cast at a speed within the range of 0.5 to 1.5 feet per minute.

4. A process in accordance with claim 1 wherein, during immersion, the total included angle of said film to the water line ranges between 100° to 135°.

* * * * *